(12) United States Patent
Hasegawa et al.

(10) Patent No.: US 12,078,562 B2
(45) Date of Patent: Sep. 3, 2024

(54) PRESSURE SENSOR

(71) Applicant: FURUKAWA ELECTRIC CO., LTD., Tokyo (JP)

(72) Inventors: Hideaki Hasegawa, Tokyo (JP); Hiroyuki Tamaoka, Tokyo (JP); Takeshi Yagi, Tokyo (JP); Shinichi Arai, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 431 days.

(21) Appl. No.: 17/446,876

(22) Filed: Sep. 3, 2021

(65) Prior Publication Data

US 2021/0396617 A1 Dec. 23, 2021

Related U.S. Application Data

(63) Continuation of application No. PCT/JP2020/009514, filed on Mar. 5, 2020.

(30) Foreign Application Priority Data

Mar. 12, 2019 (JP) ................................. 2019-044462

(51) Int. Cl.
*G01L 11/02* (2006.01)
*G02B 6/02* (2006.01)
*G02B 6/255* (2006.01)

(52) U.S. Cl.
CPC .......... *G01L 11/025* (2013.01); *G02B 6/0229* (2013.01); *G02B 6/2551* (2013.01)

(58) Field of Classification Search
CPC ..... G01L 11/025; G01L 1/243; G02B 6/0229; G02B 6/2551; G02B 6/4249; B82Y 20/00; G01H 9/004
See application file for complete search history.

(56) References Cited

U.S. PATENT DOCUMENTS

| | | | |
|---|---|---|---|
| 4,659,923 A * | 4/1987 | Hicks, Jr. ................ | G01L 1/243 73/705 |
| 4,915,473 A | 4/1990 | Haese et al. | |

(Continued)

FOREIGN PATENT DOCUMENTS

| | | |
|---|---|---|
| CN | 101261117 A | 9/2008 |
| CN | 102998039 A | 3/2013 |

(Continued)

OTHER PUBLICATIONS

Japanese Office Action issued Mar. 29, 2022 in Japanese Patent Application No. 2022-010092 (with unedited computer generated English translation), 5 pages.

(Continued)

*Primary Examiner* — Freddie Kirkland, III
(74) *Attorney, Agent, or Firm* — Oblon, McClelland, Maier & Neustadt, L.L.P.

(57) ABSTRACT

A pressure sensor includes: a light source that outputs signal light; a sensor optical fiber where the signal light is input and the signal light is propagated with a loss of 0.3 dB/m or more; and an optical receiver that receives the signal light propagated through the sensor optical fiber. Further, pressure applied to the sensor optical fiber is detected on a basis of intensity of the signal light received by the optical receiver.

13 Claims, 4 Drawing Sheets

(56) References Cited

U.S. PATENT DOCUMENTS

| | | | |
|---|---|---|---|
| 5,337,380 A | 8/1994 | Darbon et al. | |
| 7,551,810 B2 * | 6/2009 | Berger | G01N 21/7703 |
| | | | 385/12 |
| 8,478,384 B2 | 7/2013 | Schmitt et al. | |
| 8,676,299 B2 | 3/2014 | Schmitt et al. | |
| 8,744,782 B2 * | 6/2014 | Chen | G01L 1/243 |
| | | | 702/41 |
| 9,459,163 B2 | 10/2016 | Sirbuly et al. | |
| 9,921,164 B2 * | 3/2018 | Lu | G01N 21/658 |
| 10,530,117 B2 * | 1/2020 | Kajiwara | G02B 6/26 |
| 10,862,262 B2 * | 12/2020 | Kajiwara | G02B 6/26 |
| 2006/0104561 A1 | 5/2006 | Ivtsenkov | |
| 2007/0065075 A1 * | 3/2007 | Berger | G01J 3/0218 |
| | | | 250/227.12 |
| 2012/0123702 A1 * | 5/2012 | Chen | G01L 1/243 |
| | | | 702/42 |
| 2014/0187929 A1 | 7/2014 | Schmitt et al. | |
| 2017/0110847 A1 * | 4/2017 | Kajiwara | H01S 3/1022 |
| 2017/0328836 A1 * | 11/2017 | Lu | G02B 6/032 |
| 2019/0343409 A1 | 11/2019 | Schmitt et al. | |
| 2020/0083661 A1 * | 3/2020 | Kajiwara | G02B 6/02 |
| 2023/0161102 A1 * | 5/2023 | Hasegawa | G01L 1/242 |
| | | | 385/123 |
| 2023/0200658 A1 * | 6/2023 | Hasegawa | A61B 5/0084 |
| | | | 600/478 |
| 2023/0296449 A1 * | 9/2023 | Hasegawa | G01K 11/32 |
| | | | 374/161 |

FOREIGN PATENT DOCUMENTS

| | | |
|---|---|---|
| JP | 9-5021 A | 1/1997 |
| JP | 2006-258463 A | 9/2006 |
| JP | 2013-511372 A | 4/2013 |

OTHER PUBLICATIONS

International Search Report issued Mar. 31, 2020 in PCT/JP2020/009514 filed on Mar. 5, 2020, 2 pages.

Japanese Office Action issued Feb. 2, 2021 in Japanese Application No. 2019-044462, 5 pages (with English Machine Translation).

Japanese Office Action issued Jun. 8, 2021 in Japanese Application No. 2019-044462, 5 pages (with English Machine Translation).

Extended European Search Report issued Nov. 18, 2022 in European Patent Application No. 20770067.5, 8 pages.

Indian Office Action issued Jan. 23, 2023 in Indian Patent Application No. 202147040533, 5 pages.

Combined Chinese Office Action and Search Report issued Mar. 29, 2024, in corresponding Chinese Patent Application No. 202080017056.1 (with English Translation and English Translation of Category of Cited Documents), 19 pages.

* cited by examiner

PRESSURE SENSOR

CROSS-REFERENCE TO RELATED APPLICATION(S)

This application is a continuation of International Application No. PCT/JP2020/009514, filed on Mar. 5, 2020 which claims the benefit of priority of the prior Japanese Patent Application No. 2019-044462, filed on Mar. 12, 2019, the entire contents of which are incorporated herein by reference.

BACKGROUND

The present disclosure relates to pressure sensors.

A pressure sensor used for an optical coherence tomography (OCT) system has been disclosed conventionally as a pressure sensor (Japanese National Publication of International Patent Application No. 2013-511372). The pressure sensor disclosed in Japanese National Publication of International Patent Application No. 2013-511372 has a diaphragm provided as a pressure detecting body at an end portion of an optical fiber, and detects pressure by utilization of interference of light.

SUMMARY

There is a need for providing a pressure sensor having a small-sized and simple configuration.

According to an embodiment, a pressure sensor includes: a light source that outputs signal light; a sensor optical fiber where the signal light is input and the signal light is propagated with a loss of 0.3 dB/m or more; and an optical receiver that receives the signal light propagated through the sensor optical fiber. Further, pressure applied to the sensor optical fiber is detected on a basis of intensity of the signal light received by the optical receiver.

DETAILED DESCRIPTION

In the related art, a device that detects pressure by utilization of interference of light tends to have a complicated and large-sized configuration, and thus has a problem that the cost of the device tends to become expensive. There is also a demand for a pressure sensor having a small-sized and simple configuration depending on its use.

Embodiments will be described below by reference to the drawings. The disclosure is not limited by these embodiments. Furthermore, the same reference sign will be assigned to elements that are the same or corresponding to each other, as appropriate, throughout the drawings. It also needs to be noted that the drawings are schematic, and relations among dimensions of elements and ratios among the elements, for example, may be different from the actual ones. A portion having different dimensional relations and ratios among the drawings may also be included.

FIRST EMBODIMENT

Figure 1:
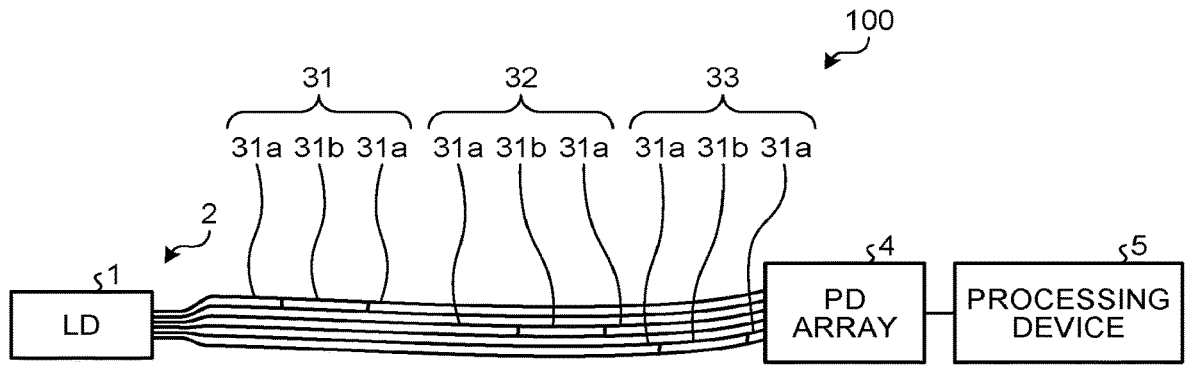
FIG. 1 is a diagram of a schematic configuration of a pressure sensor according to a first embodiment.

FIG. 1 is a diagram of a schematic configuration of a pressure sensor according to a first embodiment. A pressure sensor 100 includes a light source 1, an optical branching unit 2, plural (three in this embodiment) optical transmission bodies 31, 32, and 33, a photo diode (PD) array 4 that is an optical receiver, and a processing device 5.

The light source 1 is a laser diode (LD) in this embodiment, and outputs signal light having a wavelength of, for example, 1550 nm to the optical branching unit 2. The wavelength of the signal light may be 1100 nm. The optical branching unit 2 branches the signal light into three branches and outputs the three branches respectively to the optical transmission bodies 31, 32, and 33.

The optical transmission body 31 includes two transmission optical fibers 31a and one sensor optical fiber 31b. The two transmission optical fibers 31a in the optical transmission body 31 are respectively connected to both ends of the sensor optical fiber 31b by fusion splicing, for example.

Similarly, the optical transmission body 32 includes two transmission optical fibers 31a and one sensor optical fiber 31b. The two transmission optical fibers 31a in the optical transmission body 32 are respectively connected to both ends of the sensor optical fiber 31b by fusion splicing, for example.

Similarly, the optical transmission body 33 includes two transmission optical fibers 31a and one sensor optical fiber 31b. The two transmission optical fibers 31a in the optical transmission body 33 are respectively connected to both ends of the sensor optical fiber 31b by fusion splicing, for example.

The optical transmission bodies 31, 32, and 33 are arranged in parallel and may be bundled by a binder. Furthermore, positions of the sensor optical fibers 31b respectively included in the optical transmission bodies 31, 32, and 33 are different from one another along a longitudinal direction thereof. Each of the sensor optical fibers 31b has a length of, for example, about a few centimeters (cm) to a few meters (m).

The sensor optical fibers 31b are configured such that the signal light is propagated through the sensor optical fiber 31b with a large propagation loss of 0.3 dB/m or more.

Figure 2A:
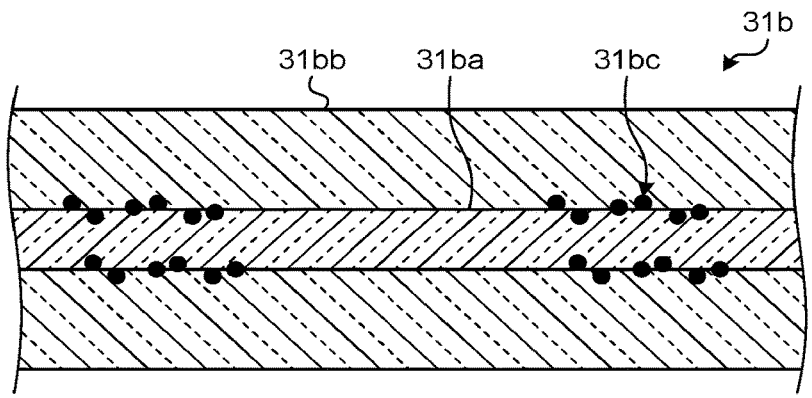
FIG. 2A is a schematic sectional view along a longitudinal direction of a sensor optical fiber.
Figure 2B:
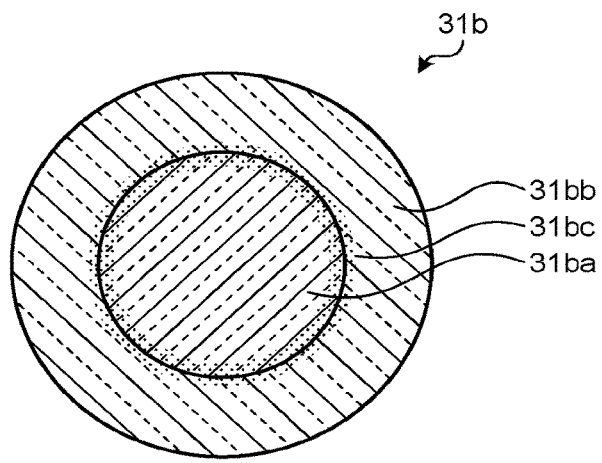
FIG. 2B is a schematic sectional view along a plane perpendicular to the longitudinal direction of the sensor optical fiber.

A configuration of the sensor optical fibers 31b in this embodiment will be described by reference to FIG. 2A and FIG. 2B. FIG. 2A is a sectional view along a longitudinal direction of the sensor optical fiber 31b and FIG. 2B is a sectional view along a plane perpendicular to the longitudinal direction of the sensor optical fiber 31b.

The sensor optical fibers 31b are formed of a silica-based material in this embodiment, and each have a core portion 31ba and a cladding portion 31bb formed around the core portion 31ba and having a refractive index lower than that of the core portion 31ba. A core diameter of the core portion 31ba and its relative refractive-index difference from the cladding portion 31bb are set such that the sensor optical fiber 31b is able to propagate the signal light in a single mode. Furthermore, a coating may be formed around the cladding portion 31bb.

Plural nanostructures 31bc are present near the interface between the core portion 31ba and the cladding portion 31bb in the sensor optical fiber 31b. The nanostructures 31bc may be present over the entire radius of the cladding portion 31bb. The nanostructures 31bc are, for example, fine particles, cylindrical tubes, or voids (air voids that are not tubes nor fine particles), and may include at least two types from the fine particles, cylindrical tubes, and voids.

Because the signal light is scattered by the nanostructures 31bc, for example, in the sensor optical fiber 31b having the above described configuration, optical confinement for the signal light is comparatively weak in the core portion 31ba and the signal light thus leaks easily therefrom. Therefore, the propagation loss for the signal light is large at 0.3 dB/m or more. According to investigation by the inventors of the present disclosure, when pressure is applied to the sensor optical fiber 31b whose optical confinement for the signal light in the core portion 31ba is comparatively weak as described above, the propagation loss in the sensor optical fiber 31b changes correspondingly to the pressure comparatively sensitively. In particular, when pressure is applied to the sensor optical fiber 31b having the nanostructures 31bc, relative positions and shapes of the nanostructures 31bc change and the propagation loss thus changes correspondingly to the pressure comparatively sensitively.

Figure 3:
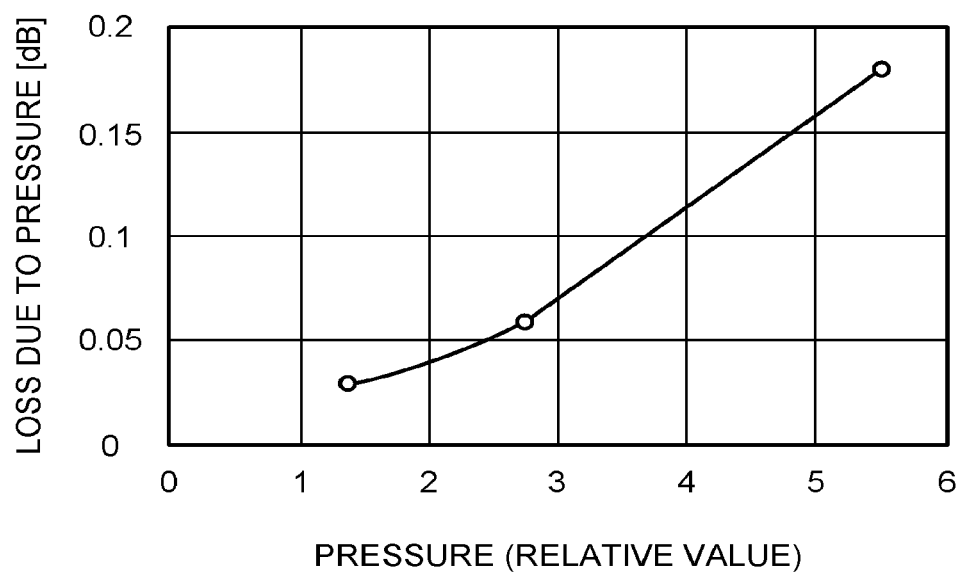
FIG. 3 is a diagram illustrating an example of a relation between pressure applied to the sensor optical fiber and increase in loss due to the pressure.

FIG. 3 is a diagram illustrating an example of a relation between pressure (relative value) applied to the sensor optical fiber 31b and increase in loss due to the pressure. In FIG. 3, the pressure is applied by application of a load to the sensor optical fiber 31b by interposing the sensor optical fiber 31b between glass plates. A normal optical fiber for optical fiber transmission, for example, a single mode optical fiber conforming to the International Telecommunication Union (ITU-T) G.652, has almost no increase in loss due to pressure in the pressure range illustrated in FIG. 3. In contrast, the loss in the sensor optical fiber 31b increases as the pressure increases. That is, sensitivity of the sensor optical fiber 31b to the pressure is high.

The pressure sensed by the sensor optical fiber 31b is, for example, pressure from fluid (liquid or gas) around the sensor optical fiber 31b or pressure due to a load applied to the sensor optical fiber 31b.

The transmission optical fibers 31a are optical fibers having a smaller propagation loss than the sensor optical fibers 31b. For example, the transmission optical fibers 31a are single mode optical fibers conforming to ITU-T G.652. The signal light is propagated through the transmission optical fiber 31a in a single mode and a propagation loss in the transmission optical fiber 31a is, for example, 0.3 dB/km.

As illustrated in FIG. 1, the optical transmission bodies 31, 32, and 33 are optically connected to the PD array 4. The signal light input is propagated through the optical transmission bodies 31, 32, and 33 and output to the PD array 4. The PD array 4 includes three PDs, receives the signal light output respectively from the optical transmission bodies 31, 32, and 33 at the PDs, and outputs electric current signals of electric current values according to intensity of the received signal light, to the processing device 5. That is, in this embodiment, the PD array 4 in the pressure sensor 100 receives the signal light input from one of ends of the sensor optical fibers 31b or optical transmission bodies 31, 32, and 33, at the other one of the ends of the sensor optical fibers 31b or optical transmission bodies 31, 32, and 33.

The processing device 5 includes an arithmetic unit and a storage unit. The arithmetic unit performs various types of arithmetic processing for implementing processing executed by the processing device 5 and functions of the processing device 5, and is formed of, for example, a central processing unit (CPU), a field-programmable gate array (FPGA), or both of the CPU and the FPGA. The storage unit includes a portion formed of, for example, a read only memory (ROM) where various programs and data, for example, used by the arithmetic unit to perform the arithmetic processing, are stored. Furthermore, the storage unit includes a portion formed of, for example, a random access memory (RAM) used, for example, as a working space for the arithmetic processing by the arithmetic unit and for storing results of the arithmetic processing by the arithmetic unit. The processing device 5 also includes an input unit that receives input of the electric current signals from the PD array 4 and performs AD conversion, and a display unit that displays, for example, characters and symbols for reporting various types of information.

The processing device 5 acquires information on intensity of the signal light received by each of the PDs, from the electric current signals input from the PD array 4. On the basis of the information on the intensity, pressure applied to the sensor optical fibers 31b is then detected.

Specifically, as illustrated in FIG. 3, the propagation loss in each of the sensor optical fibers 31b changes according to the pressure applied, and the intensity of the signal light received by each of the PDs also changes according to the pressure. The processing device 5 stores, as table data, the relation between the intensity of the signal light received by each of the PDs and the pressure applied to each of the sensor optical fibers 31b, in the storage unit. On the basis of the table data and the intensity of the signal light received by each of the PDs, the processing device 5 finds the pressure applied to each of the sensor optical fibers 31b. The value of pressure found may be displayed, for example, on the display unit by the processing device 5.

Furthermore, as described above, because the positions of the sensor optical fibers 31b respectively included in the optical transmission bodies 31, 32, and 33 are different from one another along the longitudinal direction, the sensor optical fibers 31b are able to be used for detection of pressure at different positions along the longitudinal direction. The pressure sensor 100 thereby functions as a distributed pressure sensor.

The nanostructures 31bc preferably each have a sectional diameter of 100 nm or smaller, the sectional diameter being that of a cross section perpendicular to the longitudinal direction of the sensor optical fibers 31b. If the nanostructures 31bc have a sectional diameter of 100 nm or larger, the area occupied by air in the cross section becomes large, the effective refractive index difference from the core portion 31ba formed of a silica-based material thus becomes large, and leakage of light or diffusion of light thus becomes difficult to be caused. Therefore, setting the sectional diameter to 100 nm or smaller enables the sensitivity to pressure to be increased and excessive loss to be prevented. The sectional diameter is desirably larger than the molecular size of silica, and equal to or larger than a lower limit of 1 nm, the lower limit influencing light. Furthermore, the nanostructure 31bc are preferably distributed in a length section of 1 m or less along the longitudinal direction. Being distributed in the length section of 1 m or less herein means that the length of the section in which the nanostructures 31bc are sequentially present is less than 1 m. For example, in FIG. 2A, there are two sections in which the nanostructures 31*bc* are sequentially present, and these sections both have a length less than 1 m along the longitudinal direction. Excessive loss due to the nanostructures 31*bc* is thereby able to be prevented and influence on the propagation characteristics is thereby able to be reduced.

Figure 4:
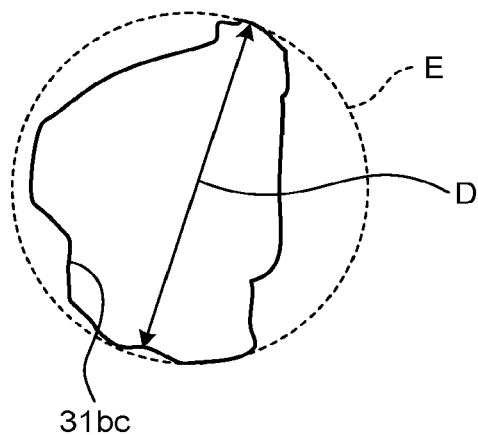
FIG. 4 is a diagram for explanation of a sectional diameter.

Cross sections of the nanostructures 31*bc* may be not circular. If they are not circular, as illustrated in FIG. 4, a major axis D of an ellipse E circumscribing the sectional shape of each of the nanostructures 31*bc* may be defined as the sectional diameter.

As described above, because the signal light is propagated through the sensor optical fibers 31*b*, the propagated signal light is received, and the pressure is able to be detected on the basis of intensity of the received signal light; the pressure sensor 100 according to this embodiment is able to have a small-sized and simple configuration without use of a component like an interferometer. For example, the pressure sensor 100 facilitates implementation of a multipoint pressure sensor in the order of several meters at lower cost. Furthermore, the sensor optical fibers 31*b* that detect pressure have a small diameter and are thus suitable for detecting pressure in a narrow space.

The sensor optical fibers 31*b* may be manufactured by application of an optical fiber manufacturing method disclosed in Japanese National Publication of International Patent Application No. 2013-511749, for example. If the nanostructures 31*bc* are fine particles, a method of forming an optical fiber preform by inserting a core preform into a glass capillary serving as a cladding material may be adopted, for example. In this case, the sensor optical fiber 31*b* may be manufactured by drawing the optical fiber preform after mixing the fine particles into voids between the core preform and the glass capillary. The fine particles are able to be prevented from being melted or deformed even at a high temperature of about 1400° C. that is a heating temperature for drawing a silica based optical fiber preform, as long as the fine particles are formed of a material having a melting point of 1500° C. or higher. Any of carbon, tantalum, molybdenum, tungsten, chromium oxide, and zirconium oxide, for example, may be selected as appropriate as the material having a high melting point.

SECOND EMBODIMENT

Figure 5:
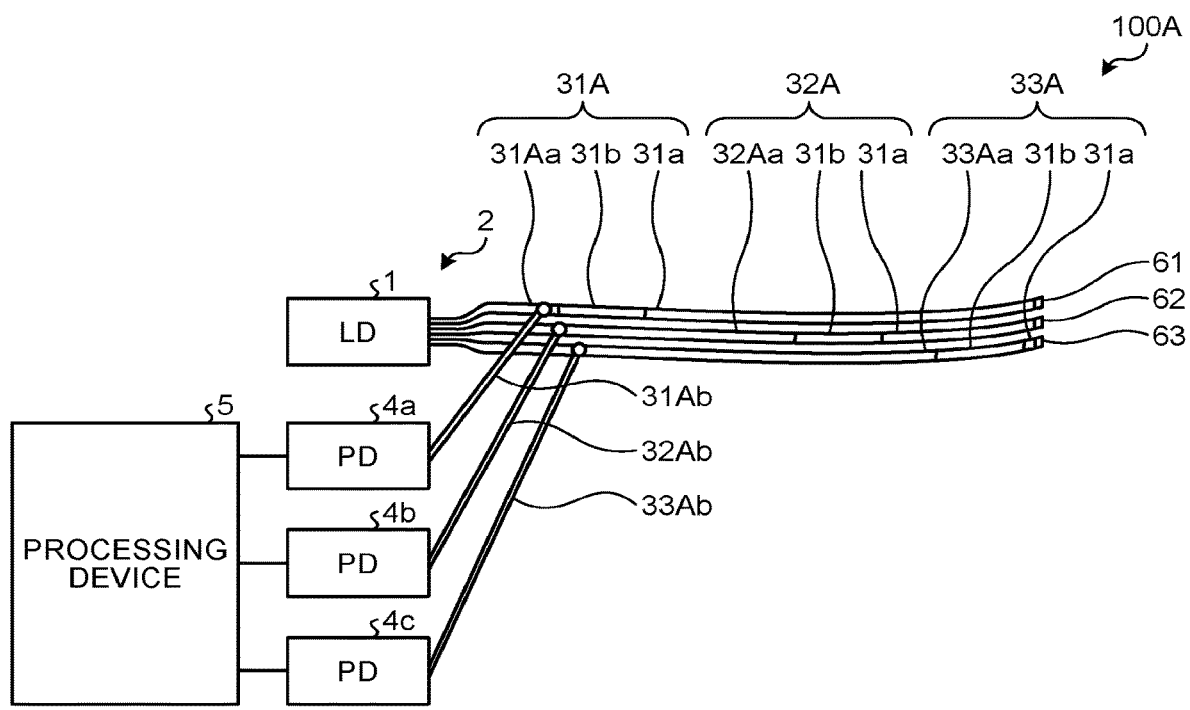
FIG. 5 is a diagram of a schematic configuration of a pressure sensor according to a second embodiment.

FIG. 5 is a diagram of a schematic configuration of a pressure sensor according to a second embodiment. A pressure sensor 100A has a configuration including: optical transmission bodies 31A, 32A, and 33A replacing the optical transmission bodies 31, 32, and 33 in the configuration of the pressure sensor 100 illustrated in FIG. 1; PDs 4*a*, 4*b*, and 4*c* replacing the PD array 4 in the configuration of the pressure sensor 100; and reflecting coatings 61, 62, and 63 formed of a dielectric substance or a metal, for example, additionally to the configuration of the pressure sensor 100.

The optical transmission body 31A includes a transmission optical fiber 31Aa, a transmission optical fiber 31*a*, and a sensor optical fiber 31*b*. The transmission optical fiber 31Aa and transmission optical fiber 31*a* in the optical transmission body 31A are respectively connected to both ends of the sensor optical fiber 31*b* by fusion splicing, for example. The transmission optical fiber 31Aa is also connected to the optical branching unit 2. A reflecting coating 61 is provided on an end face of the transmission optical fiber 31*a*, the end face being at one of the ends of the transmission optical fiber 31*a*, the one being not connected to the sensor optical fiber 31*b*. The transmission optical fiber 31Aa has a branching portion midway through the transmission optical fiber 31Aa and a transmission optical fiber 31Ab is connected to the branching portion.

Similarly, the optical transmission body 32A includes a transmission optical fiber 32Aa, a transmission optical fiber 31*a*, and a sensor optical fiber 31*b*. The transmission optical fiber 32Aa and transmission optical fiber 31*a* in the optical transmission body 32A are respectively connected to both ends of the sensor optical fiber 31*b* by fusion splicing, for example. The transmission optical fiber 31Aa is also connected to the optical branching unit 2. A reflecting coating 62 is provided on an end face of the transmission optical fiber 31*a*, the end face being at one of the ends of the transmission optical fiber 31*a*, the one being not connected to the sensor optical fiber 31*b*. Furthermore, the transmission optical fiber 32Aa has a branching portion midway through the transmission optical fiber 32Aa and a transmission optical fiber 32Ab is connected to the branching portion.

Similarly, the optical transmission body 33A includes a transmission optical fiber 32Aa, a transmission optical fiber 31*a*, and a sensor optical fiber 31*b*. The transmission optical fiber 33Aa and transmission optical fiber 31*a* in the optical transmission body 33A are respectively connected to both ends of the sensor optical fiber 31*b* by fusion splicing, for example. The transmission optical fiber 33Aa is also connected to the optical branching unit 2. A reflecting coating 63 is provided on an end face of the transmission optical fiber 31*a*, the end face being at one of the ends of the transmission optical fiber 31*a*, the one being not connected to the sensor optical fiber 31*b*. Furthermore, the transmission optical fiber 33Aa has a branching portion midway through the transmission optical fiber 33Aa and a transmission optical fiber 33Ab is connected to the branching portion. The branching portions of the transmission optical fibers 31Aa, 32Aa and 33Aa are each formed of an optical coupler or an optical circulator, for example.

The transmission optical fibers 31Aa, 32Aa, 33Aa, 31Ab, 32Ab, and 33Ab are optical fibers smaller in propagation loss than the sensor optical fibers 31*b* and are, for example, similar to the transmission optical fibers 31*a*.

The optical transmission bodies 31A, 32A, and 33A are arranged in parallel. Furthermore, positions of the sensor optical fibers 31*b* respectively included in the optical transmission bodies 31A, 32A, and 33A are different from one another along a longitudinal direction thereof.

The transmission optical fibers 31Ab, 32Ab, and 33Ab are optically connected respectively to the PDs 4*a*, 4*b*, and 4*c*.

The optical branching unit 2 in this pressure sensor 100A branches signal light output from the light source 1 into three branches and outputs the three branches respectively to the optical transmission bodies 31A, 32A, and 33A. The signal light input is propagated through the optical transmission bodies 31A, 32A, and 33A. The signal light is then propagated through the sensor optical fibers 31*b* in the optical transmission bodies 31A, 32A, and 33A.

The reflecting coating 61 reflects the signal light propagated through the optical transmission body 31A at the end face of the optical transmission body 31A. The reflected signal light is propagated through the optical transmission body 31A toward the light source 1. At least a part of the reflected signal light is introduced into the transmission optical fiber 31Ab at the branching portion. The transmission optical fiber 31Ab outputs the introduced signal light to the PD 4*a*.

The reflecting coating 62 reflects the signal light propagated through the optical transmission body 32A at the end face of the optical transmission body 32A. The optical transmission body 32A propagates the reflected signal light toward the light source 1. At least a part of the reflected signal light is introduced into the transmission optical fiber 32Ab at the branching portion. The transmission optical fiber 32Ab outputs the introduced signal light to the PD 4b.

The reflecting coating 63 reflects the signal light propagated through the optical transmission body 33A at the end face of the optical transmission body 33A. The reflected signal light is propagated through the optical transmission body 33A toward the light source 1. At least a part of the reflected signal light is introduced into the transmission optical fiber 33Ab at the branching portion. The transmission optical fiber 33Ab outputs the introduced signal light to the PD 4c.

That is, the PDs 4a, 4b, and 4c in the pressure sensor 100A respectively receive the signal light reflected at respective optical fiber facets of the optical transmission bodies 31A, 32A, and 33A.

The PDs 4a, 4b, and 4c respectively output electric current signals of electric current values corresponding to respective intensities of the received light, to the processing device 5.

The processing device 5 acquires information on the intensities of the signal light received respectively by the PDs 4a, 4b, and 4c, from the electric current signals respectively input from the PDs 4a, 4b, and 4c. On the basis of the information on the intensities, pressure applied to each of the sensor optical fibers 31b is then detected.

Similarly to the first embodiment, the pressure sensor 100A according to this embodiment has a small-sized and simple configuration. Furthermore, the sensitivity to pressure per unit length of the sensor optical fibers 31b is able to be increased because the pressure is detected on the basis of the intensities of the signal light that has reciprocated through the sensor optical fibers 31b.

The signal light is reflected by the reflecting coatings 61, 62, and 63 in the pressure sensor 100A, but the signal light may be reflected by utilization of Fresnel reflection at the optical fiber facets of the transmission optical fibers 31a without provision of the reflecting coatings 61, 62, and 63. Furthermore, in a case where transmission optical fibers have not been connected to sensor optical fibers in optical transmission bodies oppositely to a light source, signal light may be reflected by providing reflecting coatings on optical fiber facets of the sensor optical fibers or by utilizing Fresnel reflection at the optical fiber facets of the sensor optical fibers.

THIRD EMBODIMENT

Figure 6A:
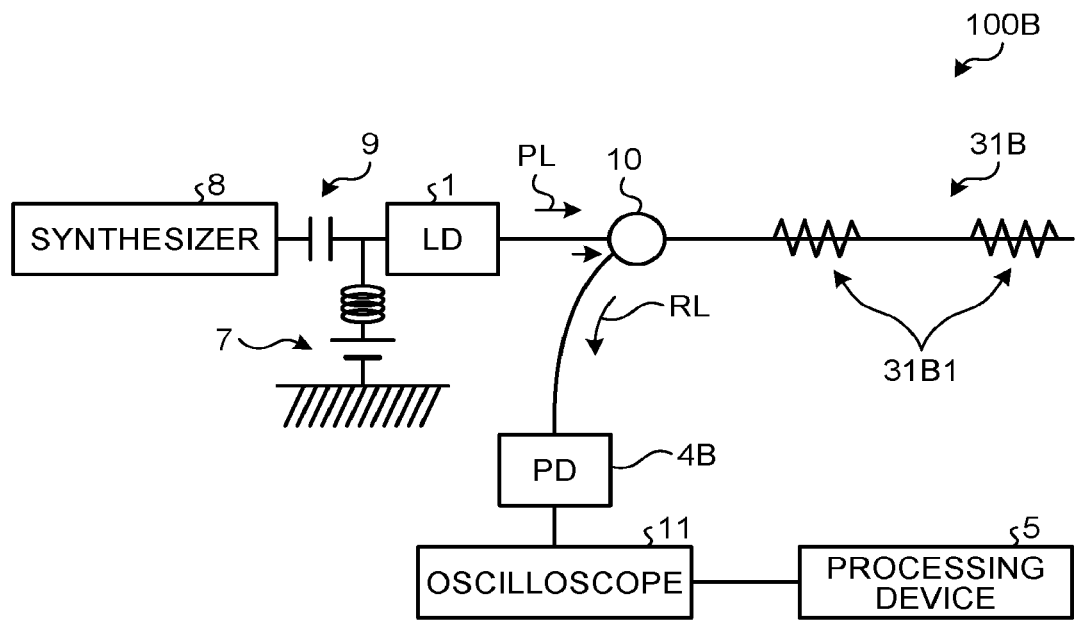
FIG. 6A is a diagram of a schematic configuration of a pressure sensor according to a third embodiment.

FIG. 6A is a diagram of a schematic configuration of a pressure sensor according to a third embodiment. As illustrated in FIG. 6A, a pressure sensor 100B includes a light source 1, a DC power source 7, a synthesizer 8 that is a signal generator, a bias tee 9, a branching unit 10, a sensor optical fiber 31B, a PD 4B, an oscilloscope 11, and a processing device 5.

The light source 1 is an LD, is supplied with DC electric current from the DC power source 7, and is supplied with a periodic electric pulse signal from the synthesizer 8. The light source 1 thereby outputs signal light PL that has been directly modulated and is periodic optical pulses, to the branching unit 10. The bias tee 9 is provided for supplying the DC electric current to the light source 1 without affecting the electric pulse signal.

The signal light PL has a pulse width of, for example, 10 ps to 100 ps. The repetition period is preferably as short as possible while enabling the pulse width to be achieved, and is, for example, 1 GHz in frequency.

The branching unit 10 outputs the input signal light PL to the sensor optical fiber 31B. The branching unit 10 is formed of an optical coupler or an optical circulator, for example.

The sensor optical fiber 31B has a structure that is the same as that of the sensor optical fiber 31b except that a fiber Bragg grating (FBG) unit 31B1 serving as a reflecting unit has been formed midway through the sensor optical fiber 31B at each of plural positions (two positions in this embodiment) along a longitudinal direction thereof. The FBG units 31B1 each have a configuration with plural high refractive index portions formed at predetermined intervals along the longitudinal direction in a core portion thereof. The high refractive index portions have a refractive index higher than a refractive index of the core portion at a part where no FBG units 31B1 have been formed in the sensor optical fiber 31B. The FBG units 31B1 are each configured to selectively reflect light having a wavelength of the signal light PL at predetermined reflectivity.

The signal light PL is propagated rightward through the sensor optical fiber 31B in the figure. A part of the signal light PL is then returned as Rayleigh scattered light toward the branching unit 10. Furthermore, a part of the signal light PL is reflected by the FBG units 31B1 and returned as reflected light toward the branching unit 10.

The branching unit 10 causes returned light RL including the Rayleigh scattered light and the reflected light to be input to the PD 4B. The PD 4B outputs an electric current signal of electric current values according to intensity of received light, to the oscilloscope 11.

Figure 6B:
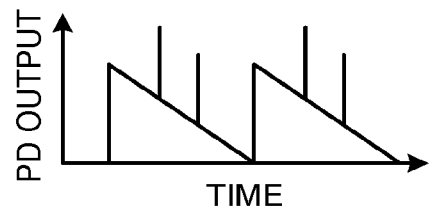
FIG. 6B is a schematic waveform diagram of the pressure sensor according to the third embodiment.

FIG. 6B is a waveform diagram observed by means of the oscilloscope 11. The horizontal axis corresponds to time and the vertical axis corresponds to the electric current value (PD output) of the electric current signal output by the PD 4B. The PD output has a periodic waveform. The waveform represents the intensity of received light. The time along the horizontal axis corresponds to the position at which the received light is generated, and specifically to the distance from an end portion of the sensor optical fiber 31B, the end portion being near the branching unit 10.

The intensity of received light is high for the Rayleigh scattered light generated at a position near the branching unit 10 in the sensor optical fiber 31B. The intensity decreases due to the loss in the sensor optical fiber 31B as the distance from the position at which the Rayleigh scattered light is generated is increased. The peaks correspond to the light reflected by the two FBG units 31B1. This reflected light is higher in intensity than the Rayleigh scattered light. The waveform information signal observed by means of the oscilloscope 11 is output to the processing device 5.

The processing device 5 acquires, from the waveform information signal, temporal information, that is, positional information, on the intensity of the returned light RL (that is, the Rayleigh scattered light and the reflected light) generated from the signal light. On the basis of the positional information on the intensity, a positional distribution of pressure applied to the sensor optical fiber 31B is detected. In particular, by detecting pressure from the intensity of the reflected light from the two FBG units 31B1, more highly accurate and temporally stable pressure detection is enabled, the reflected light being comparatively high in intensity.

Similarly to the first embodiment, the pressure sensor 100B according to this embodiment has a small-sized and simple configuration. Furthermore, a positional distribution of pressure is able to be detected by the single sensor optical fiber 31B.

The reflecting units are the FBG units in this embodiment, but the reflecting units may each be formed of a single high refractive index portion, for example. Furthermore, the reflecting units are formed in the sensor optical fiber in this embodiment, but a transmission optical fiber may be connected to one of ends of the sensor optical fiber, and a reflecting unit may be formed in a core portion of this transmission optical fiber, the one being opposite to the other one of the ends, the other one being where the light source is.

In the above described embodiments, the transmission optical fibers positioned closer to the light source than the sensor optical fibers are to the light source may be multi-mode optical fibers. The multi-mode optical fibers may have, for example, a core diameter of 105 µm and a numerical aperture (NA) of 0.15 to 0.22, but are not particularly limited. If the transmission optical fiber is a multi-mode optical fiber, mode transformation occurs at a joint between the transmission optical fiber and the sensor optical fiber. This mode transformation is dependent on pressure, and the state of mode mismatch is also dependent on pressure. As a result, the degree of leakage of signal light in the sensor optical fiber also becomes sensitive to pressure, and sensitivity of the sensor optical fiber to pressure thus also becomes high. Furthermore, in a case where the transmission optical fiber positioned closer to the light source than the sensor optical fiber is to the light source is a multi-mode optical fiber and the multi-mode optical fiber is connected to the sensor optical fiber at the joint by fusion splicing, the pressure applied to a portion of the multi-mode optical fiber may be detected, the portion having a predetermined length from the joint. The sensitivity of the portion of the multi-mode optical fiber to pressure is also comparatively high, the portion having the predetermined length from the joint. The reason for this may be considered to be as follows, for example. That is, when pressure is applied to the joint, mode transformation occurs in the multi-mode optical fiber, and the degree of leakage of the signal light in the sensor optical fiber changes according to that pressure. However, the reason why the sensitivity to pressure is comparatively high is not limited to the above reason. The predetermined length is, for example, about 5 cm to 10 cm. The processing device acquires information on the intensity of signal light received by a light receiving element, from an electric current signal input from the light receiving element. On the basis of the information on the intensity, pressure applied to the portion of the multi-mode optical fiber is also detected, the portion having the predetermined length.

Furthermore, the transmission optical fibers connected to both ends of the sensor optical fibers may both be multi-mode optical fibers in the second embodiment. The signal light is thereby received after passing the two joints, and sensitivity of the sensor optical fibers to pressure thus becomes higher. Furthermore, in a case where the multi-mode optical fibers are connected to both ends of the sensor optical fiber by fusion splicing, pressure applied to portions of the multi-mode optical fibers at both ends of the sensor optical fiber may be detected, the portions each having a predetermined length.

Furthermore, the processing device finds the pressure in the above described embodiments, but the processing device may be configured to further find the intensity of an acoustic wave on the basis of the pressure. The pressure sensors in the embodiments described above thereby function substantially as acoustic sensors.

Furthermore, the sensor optical fibers in the above described embodiments have nanostructures, but the sensor optical fibers are not limited thereto, and optical fibers in which propagation loss of signal light is 0.3 dB/m or more and optical confinement in the core portions are comparatively weak and which are sensitive to pressure may be applied.

Furthermore, the present disclosure is not limited by the above described embodiments. Those configured by combination of the components described above as appropriate are also included in the present disclosure. In addition, further effects and modifications can be easily derived by those skilled in the art. Therefore, wider aspects of the present disclosure are not limited to the above described embodiments, and various modifications can be made.

INDUSTRIAL APPLICABILITY

The present disclosure may be used for pressure sensors.
According to an embodiment, it is possible to obtain an effect of enabling a pressure sensor having a small-sized and simple configuration.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A pressure sensor, comprising:
  a light source that outputs signal light;
  a sensor optical fiber where the signal light is input and the signal light is propagated with a loss of 0.3 dB/m or more, wherein:
    the sensor optical fiber has a core portion and a cladding portion formed around the core portion,
    plural nanostructures are present near an interface between the core portion and the cladding portion,
    the nanostructures each have a sectional diameter of 100 nm or smaller,
    the sectional diameter being that of a cross section perpendicular to a longitudinal direction of the sensor optical fiber, and
  the nanostructures are distributed in a length section of 1 m or less along the longitudinal direction; and
  an optical receiver that receives the signal light propagated through the sensor optical fiber, wherein pressure applied to the sensor optical fiber is detected on a basis of intensity of the signal light received by the optical receiver.

2. The pressure sensor according to claim 1, comprising an optical transmission body including: the sensor optical fiber; and a transmission optical fiber, connected to the sensor optical fiber, having a propagation loss smaller than the propagation loss of the sensor optical fiber.

3. The pressure sensor according to claim 2, wherein the sensor optical fiber is a single mode optical fiber at a wavelength of the signal light, and the transmission optical fiber positioned closer to the light source than the sensor optical fiber is to the light source is a multi-mode optical fiber.

4. The pressure sensor according to claim 3, wherein the multi-mode optical fiber is connected to the sensor optical fiber at a joint by fusion splicing, and pressure applied to a portion of the multi-mode optical fiber is detected, the portion having a predetermined length from the joint.

5. The pressure sensor according to claim 2, comprising a plurality of the optical transmission bodies arranged in parallel, wherein positions of the sensor optical fibers included respectively in the plurality of the optical transmission bodies are different from one another other along a longitudinal direction.

6. The pressure sensor according to claim 1, wherein the optical receiver is configured to receive the signal light reflected at an optical fiber facet of the sensor optical fiber or transmission optical fiber.

7. The pressure sensor according to claim 1, wherein the optical receiver is configured to receive the signal light, which is input from one of ends of the sensor optical fiber, at another end of the sensor optical fiber.

8. The pressure sensor according to claim 1, wherein
the signal light is optical pulses,
the sensor optical fiber or the transmission optical fiber has a reflecting unit midway therethrough along a longitudinal direction, and
the optical receiver is configured to receive the signal light reflected by the reflecting unit.

9. The pressure sensor according to claim 8, wherein the reflecting unit is a high refractive index portion formed in a core portion of the sensor optical fiber or transmission optical fiber.

10. The pressure sensor according to claim 1, wherein the nanostructures are fine particles, cylindrical tubes, or voids.

11. The pressure sensor according to claim 10, wherein the fine particles are formed of a material having a melting point of 1500° C. or higher.

12. The pressure sensor according to claim 1, comprising a processing device that obtains the pressure applied to the sensor optical fiber on a basis of the intensity of the signal light.

13. The pressure sensor according to claim 12, wherein the processing device is configured to obtain intensity of an acoustic wave on a basis of the pressure.

* * * * *